(12) United States Patent
Feng

(10) Patent No.: US 11,279,185 B2
(45) Date of Patent: Mar. 22, 2022

(54) VEHICLE ENGAGEMENT STRUCTURE FOR TOWING TRANSPORT DEVICES

(71) Applicant: COBARCO ENTERPRISE PTE. LTD., Singapore (SG)

(72) Inventor: Chih Teng Feng, Singapore (SG)

(73) Assignee: COBARCO ENTERPRISE PTE. LTD., Singapore (SG)

( * ) Notice: Subject to any disclaimer, the term of this patent is extended or adjusted under 35 U.S.C. 154(b) by 162 days.

(21) Appl. No.: 16/908,706

(22) Filed: Jun. 22, 2020

(65) Prior Publication Data

US 2021/0394569 A1 Dec. 23, 2021

(51) Int. Cl.
| | | |
|---|---|---|
| *B60D 1/06* | (2006.01) | |
| *B60D 1/36* | (2006.01) | |
| *B60D 1/58* | (2006.01) | |
| *B60P 3/12* | (2006.01) | |
| *B64F 1/22* | (2006.01) | |

(52) U.S. Cl.
CPC .................. *B60D 1/06* (2013.01); *B60D 1/36* (2013.01); *B60D 1/58* (2013.01); *B60P 3/125* (2013.01); *B64F 1/227* (2013.01)

(58) Field of Classification Search
CPC ........ B62D 5/0448; B62D 5/008; B62D 1/20; B62D 3/02; B62D 3/08; B62D 5/0421
See application file for complete search history.

(56) References Cited

U.S. PATENT DOCUMENTS

| | | | | |
|---|---|---|---|---|
| 6,409,202 B1* | 6/2002 | Putnam | .................... | B60D 1/06 280/495 |
| 8,016,314 B2* | 9/2011 | Visser | ...................... | B60D 1/52 280/511 |
| 10,153,542 B1* | 12/2018 | Catrow | .................. | H01Q 19/18 |
| 2018/0194181 A1* | 7/2018 | Coast | .................... | B60F 3/0038 |
| 2020/0377162 A1* | 12/2020 | Howe | .................... | B62D 61/12 |
| 2021/0162247 A1* | 6/2021 | Kovalev | ................ | A62C 31/05 |
| 2021/0206003 A1* | 7/2021 | Zhou | ........................ | B25J 9/162 |
| 2021/0394839 A1* | 12/2021 | Feng | ...................... | B62D 55/18 |

* cited by examiner

*Primary Examiner* — Kevin Hurley
*Assistant Examiner* — Marlon A Arce
(74) *Attorney, Agent, or Firm* — Chun-Ming Shih; Lanway IPR Services

(57) ABSTRACT

A vehicle engagement structure for towing transport devices is disclosed, wherein a carrier is configured with respectively an engagement towage mechanism and a drive mechanism; more specifically, the engagement towage mechanism includes an external spiral transmission component and an internal spiral transmission component, the internal spiral transmission component is further mutually in spiral engagement with a spiral rod, and the top end of the spiral rod is sequentially installed with an up-and-down pedestal, a rotation seat, an engagement base and an engagement end applied to connect to a transport device; in addition, the drive mechanism is configured to control the up-and-down pedestal to vertically ascend or descend on the spiral rod, thereby facilitating the engagement end to adapt to the height of the transport device or topographic fluctuations and variations during movement.

10 Claims, 7 Drawing Sheets

VEHICLE ENGAGEMENT STRUCTURE FOR TOWING TRANSPORT DEVICES

BACKGROUND OF THE INVENTION

1. Field of the Invention

The present invention generally relates to a vehicle engagement structure for towing transport devices; specifically, it relates to an engagement structure facilitating movement and transmission operations which can be applied for connecting to towing trailers, camper vans, large containers, ships or aircrafts and other transport devices etc.

2. Description of Related Art

It is known that existing types of transport devices, such as trailers, campers, large containers, and even ships or aircraft, are towed to a last parking or application location (for example, an indoor garage) by means of various steerable movement and transmission vehicles. However, the volume and structural configuration of such transport devices may not be completely consistent, thus resulting in different height positions of the engagement end which is used to connect with the movement and transmission vehicles, so the same movement and transmission vehicle may not be applied to various types of transport devices. Besides, during the towing process, since the terrain will demonstrate high and low fluctuations, the connection position between the connection end of the transport device and the movement and transmission vehicle may be loosened, fall off or turn over because of the position difference, thus potentially leading to transportation hazards.

Moreover, the position on the movement and transmission vehicle used to connect with the engagement end may turn around during the towing process, thus probably creating huge torque force therein; hence, if such torque force cannot be effectively released or resolved, the connection position may be damaged or broken, which is very risky for transport operations.

Therefore, the present invention improves the engagement structure and provides a kind of controllable up-and-down mechanism so that, through modifying the elevation height, it is possible to connect to various types of transport devices, and, at the same time, such an up-and-down mechanism features a rotatable configuration so as to greatly release the torque force generated during the towing process, thus illustrating the solution offered by the vehicle engagement structure for towing transport devices according to the present invention.

SUMMARY OF THE INVENTION

The vehicle engagement structure for towing transport devices according to the present invention is disclosed, comprising a carrier, an engagement towage mechanism and a drive mechanism, wherein a conveyance track for driving the carrier to operate is respectively installed on both sides of the carrier, with each conveyance track being connectively assembled to a first motor; the engagement towage mechanism is installed on the carrier and includes an outer case internally having an up-and-down space, a hole is openly set up on the lateral side of the outer case, an external spiral transmission component is installed in the up-and-down space close to the hole and internally assembled with an internal spiral transmission component, such that the external spiral transmission component can drive the internal spiral transmission component to rotate in the same direction; in addition, the internal spiral transmission component is further spirally connected to a spiral rod, and a bearing is sleeve connected between the bottoms of the external spiral transmission component and the internal spiral transmission component and the outer case, an up-and-down pedestal is fixedly set up on the top of the spiral rod, and a rotation seat having a spherical surface is pivotally installed inside the up-and-down pedestal and is able to make horizontal idle rotations inside the up-and-down pedestal; besides, the top of the rotation seat is fixedly installed with an engagement base, and the top of the engagement base is provided with an engagement end which can be applied to engage a transport device; and the drive mechanism is installed on the carrier and includes a second motor and a transmission wheel set, and the transmission wheel set is connectively assembled respectively with the second motor and a transmission rod, such that the second motor can drive the transmission rod by means of the transmission wheel set; in addition, a spiral drive component is further pivotally connected on the transmission rod and is spirally jointed with the external spiral transmission component at the hole; in this way, by using a control device to control the first motor to drive the conveyance track to make transmissions, it is possible to further tow the transport device to a designated location, and control device can be also utilized to control the second motor to drive the transmission rod so as to allow the transmission rod to drive the external spiral transmission component to rotate; meanwhile, the external spiral transmission component also further drives the internal spiral transmission component to rotate in the same direction so that the spiral rod spirally engaging the internal spiral transmission component can drive the up-and-down pedestal to vertically ascend or to descend inside the up-and-down space in order to adapt to the height of the transport device or topographic fluctuations and variations during movement. Moreover, when making a turn during a towage operation, the carrier can rotate along the towage direction so that the rotation seat can correspondingly make horizontal idle rotations, thereby effectively releasing the torque force occurring at the junction of the engagement end and the connection end, thus more smoothly performing the towage operation along the rotation direction.

In a preferred embodiment, the transmission wheel set includes two transmission gears and a transmission component connected in sleeve onto each of transmission gears, with one of the transmission gears being connectively assembled with the second motor, while the other one being connectively assembled with the transmission rod, and the transmission component adopts a belt or a chain.

In a preferred embodiment, the transmission rod is pivotally connected with plural support frames, each of the transmission rods is fixedly installed on the periphery of the outer case, and the spiral drive component is located between each of the support frames.

In a preferred embodiment, both the first motor and the second motor are connected to urban power grid to obtain electricity.

In a preferred embodiment, both the first motor and the second motor are connected to a battery to obtain electricity, and the battery is fully charged and prepared in advance and is replaceable in case necessary, and the carrier is openly configured with a power supply chamber for accommodating the battery in order to facilitate the electricity supply to the first motor and the second motor.

In a preferred embodiment, the control device is a mobile phone, a tablet computer or a remote controller.

DETAILED DESCRIPTION OF THE PREFERRED EMBODIMENTS

Other technical contents, aspects and effects in relation to the present invention can be clearly appreciated through the detailed descriptions concerning the preferred embodiments of the present invention in conjunction with the appended drawings.

Figure 1:
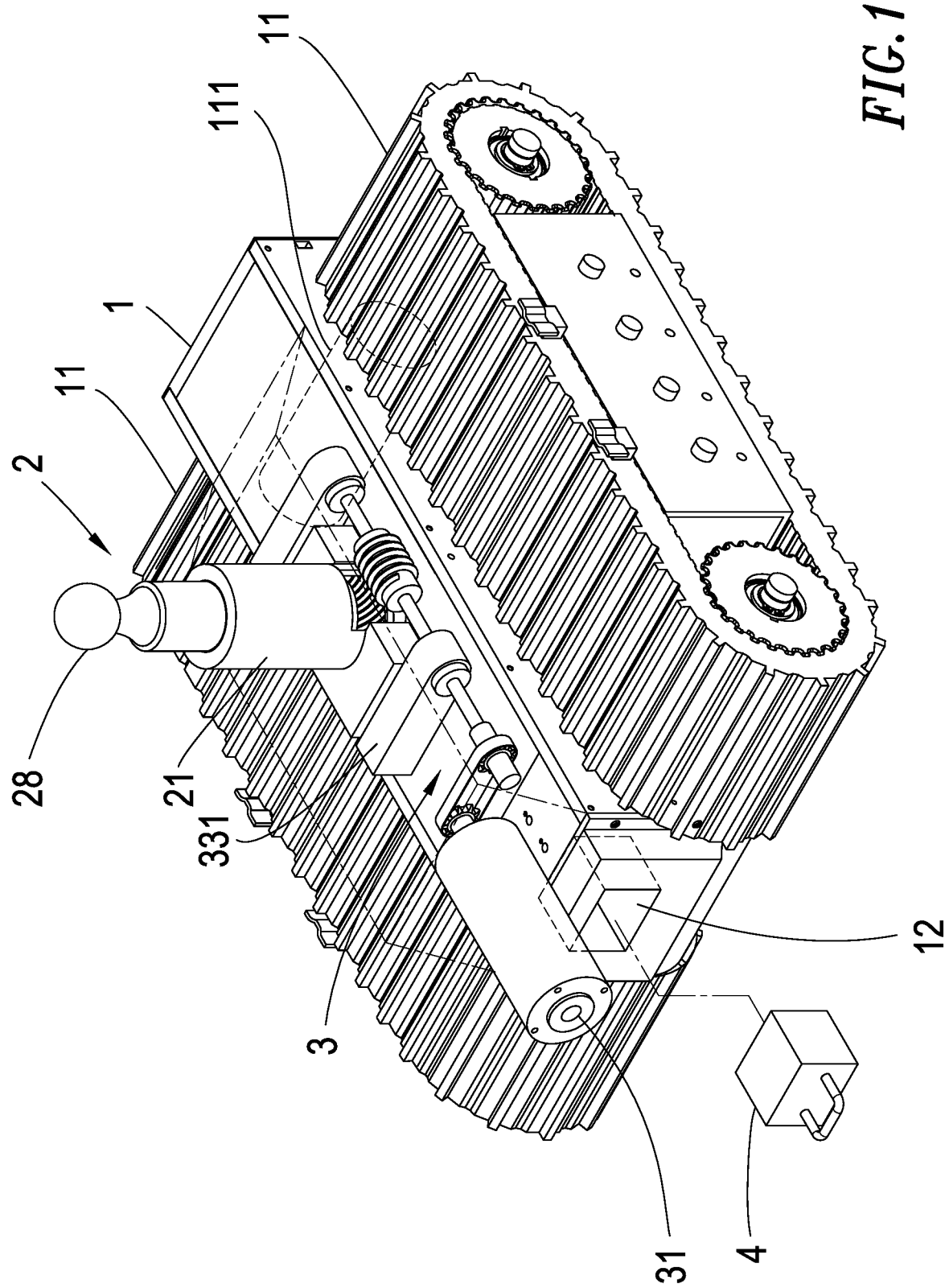
FIG. 1 shows an overall structural stereo view of the vehicle engagement structure according to the present invention.
Figure 2:
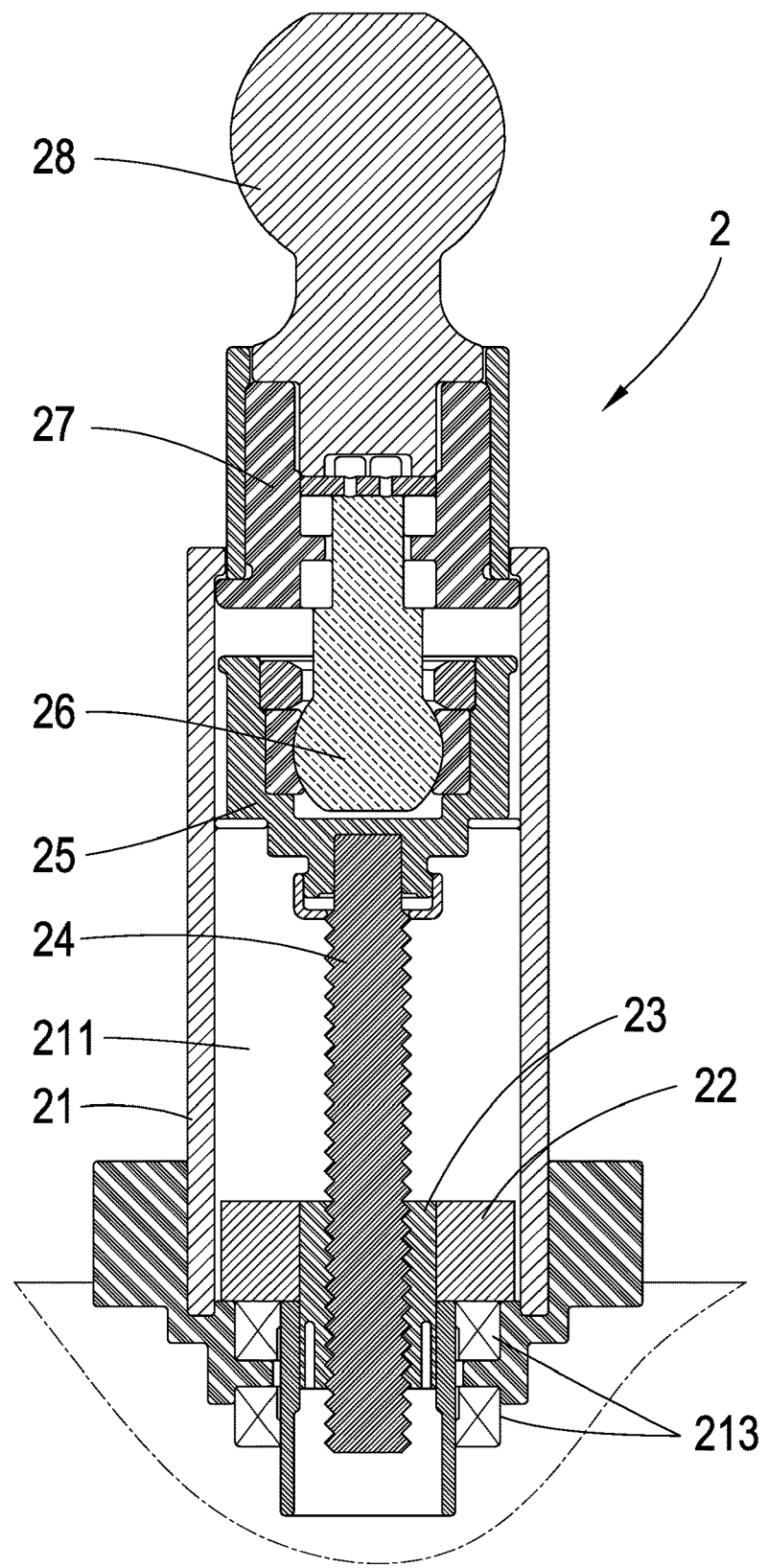
FIG. 2 shows a structural partial cross-sectioned view of the vehicle engagement structure according to the present invention.
Figure 3:
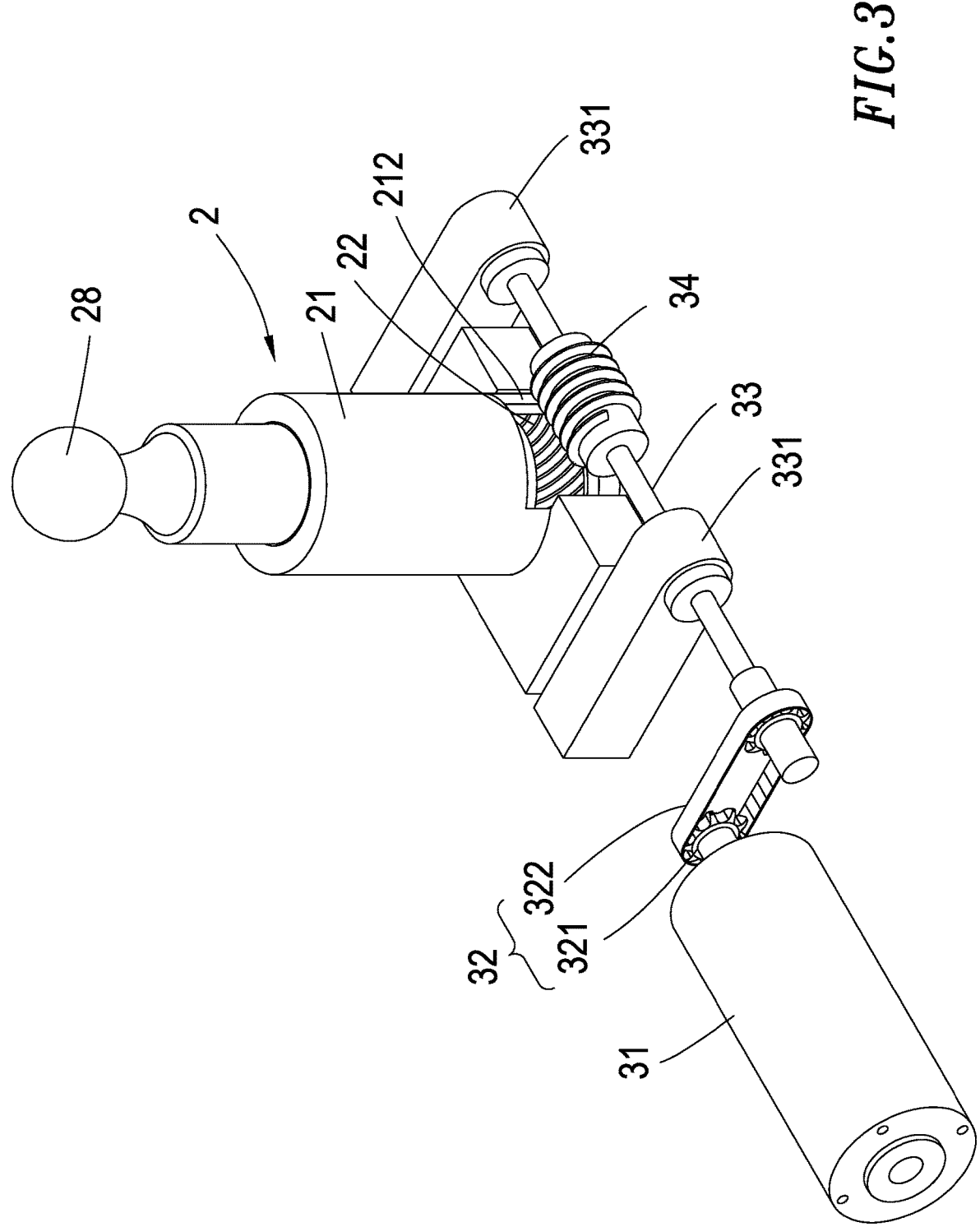
FIG. 3 shows a structural partial stereo view of the vehicle engagement structure according to the present invention.

Refer first to FIGS. 1-3, an overall structural stereo view and internal structural cross-sectioned views of the vehicle engagement structure for towing transport devices according to the present invention are respectively shown, and it can be seen from such Figures that the present embodiment comprises a carrier 1, an engagement towage mechanism 2 and a drive mechanism 3.

Herein a conveyance track 11 is respectively installed on both sides of the carrier 1, with each conveyance track 11 being connectively assembled to a first motor 111 so that each of the conveyance track 11 can be applied to drive the carrier 1 to operate.

Herein the engagement towage mechanism 2 is installed on the carrier 1, in which the engagement towage mechanism 2 includes an outer case 21 internally having an up-and-down space 211, a hole 212 is openly set up on the lateral side of the outer case 21, an external spiral transmission component 22 is installed in the up-and-down space 211 close to the hole 212 and internally assembled with an internal spiral transmission component 23, such that the external spiral transmission component 22 can drive the internal spiral transmission component 23 to rotate in the same direction; in addition, the internal spiral transmission component 23 is further spirally connected to a spiral rod 24, and a bearing 213 is sleeve connected between the bottoms of the external spiral transmission component 22 and the internal spiral transmission component 23 and the outer case 21, an up-and-down pedestal 25 is fixedly set up on the top of the spiral rod 24, and a rotation seat 26 having a spherical surface is pivotally installed inside the up-and-down pedestal 25 and is able to make horizontal idle rotations inside the up-and-down pedestal 25; besides, the top of the rotation seat 26 is fixedly installed with an engagement base 27, and the top of the engagement base 27 is provided with an engagement end 28 for engaging a transport device.

Moreover, herein the drive mechanism 3 is installed on the carrier 1, in which the drive mechanism 3 includes a second motor 31 and a transmission wheel set 32, and the transmission wheel set 32 includes two transmission gears 321 and a transmission component 322 which is sleeve connected to each of the transmission gears 321, and one of the transmission gears 321 is connectively assembled with the second motor 31 while the other one of the transmission gears 321 is connectively assembled with a transmission rod 33, in which the transmission component 322 can adopt a belt or a chain to mutually drive each of the transmission gears 321 for power transmissions such that the second motor 31 can drive the transmission rod 33 by means of the transmission wheel set 32; additionally, the transmission rod 33 is further pivotally connected with plural support frames 331 and a spiral drive component 34, each of the support frames 331 is fixedly installed around the outer case 21, and the spiral drive component 34 is located between each of the support frames 331 thereby allowing the spiral drive component 34 to be further spirally jointed with the external spiral transmission component 22 at the hole 212.

Referring to FIG. 1, it can be seen that, In the vehicle engagement structure for towing transport devices according to the present invention, both the first motor 111 and the second motor 31 can be connected to urban power grid to obtain electricity, or otherwise, both the first motor 111 and the second motor 31 may be connected to a battery 4 to obtain electricity, in which the battery 4 can be fully charged and prepared in advance, and replaced when necessary; also, the carrier 1 can be openly configured with a power supply chamber 12 for accommodating the battery 4 so as to provide the first motor 111 and the second motor 31 with electric power for operation.

Figure 4:
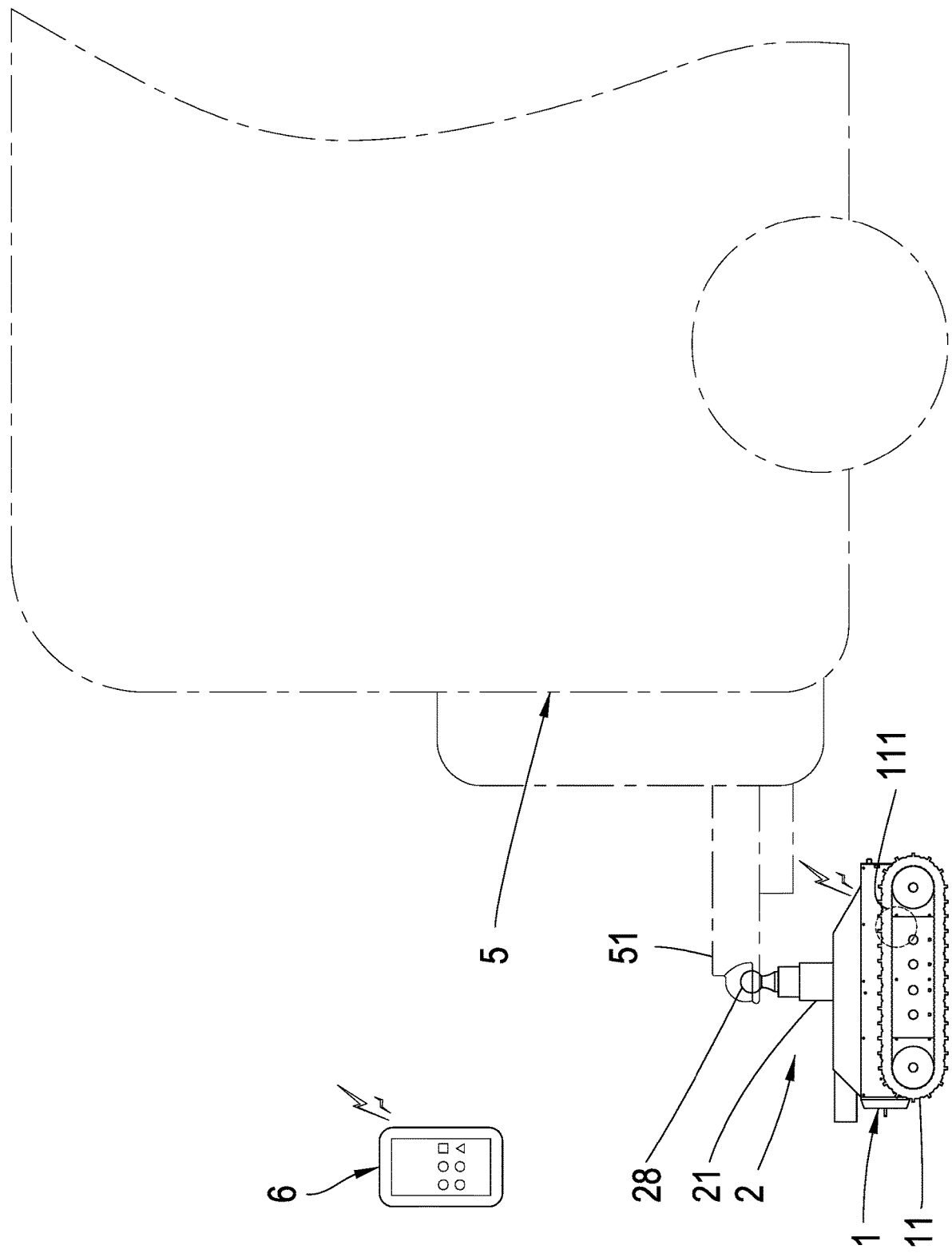
FIG. 4 shows a planar view for the implemented towage of the engagement towage mechanism in the vehicle engagement structure according to the present invention.
Figure 5A:
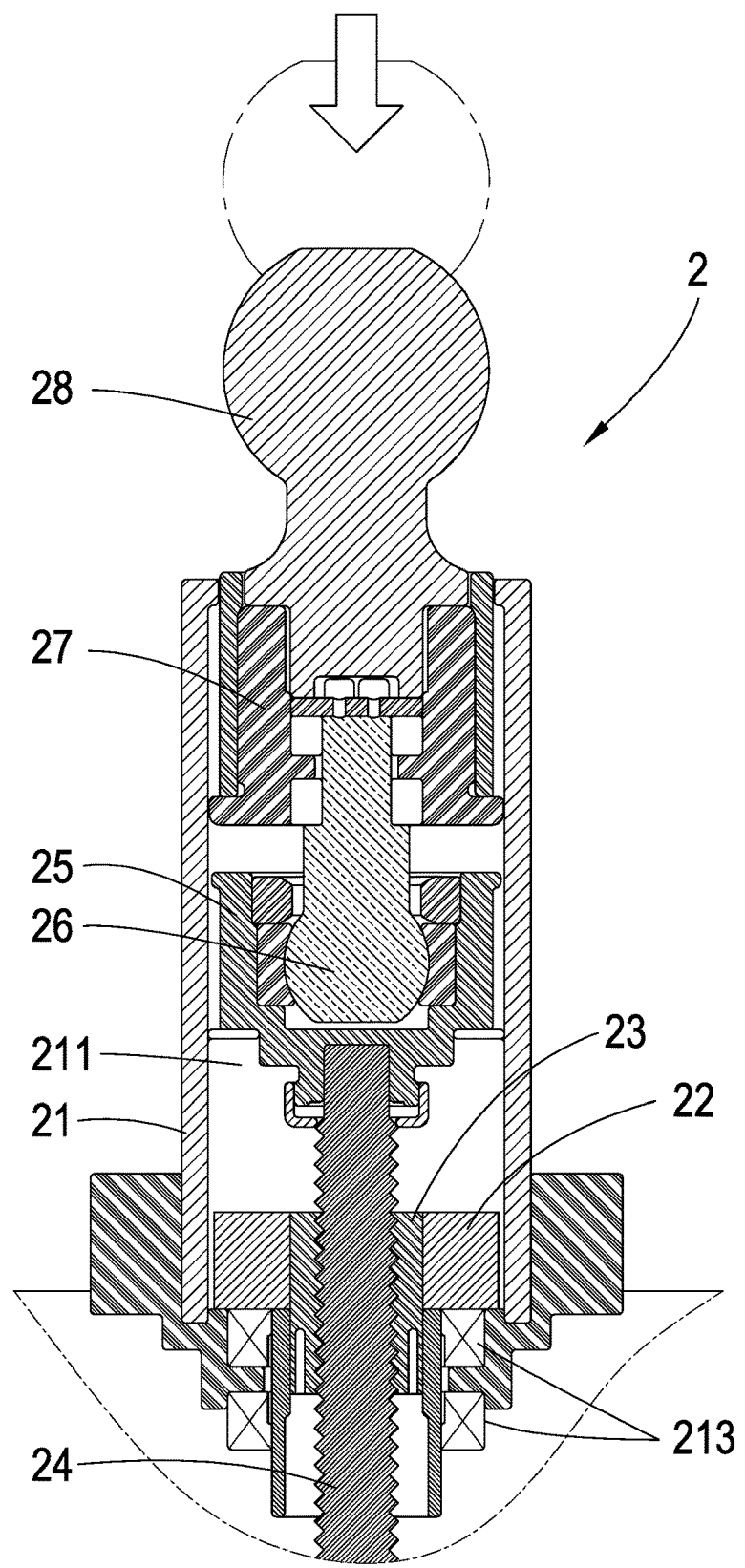
FIG. 5A shows a cross-sectioned view for the implemented descending of the engagement towage mechanism in the vehicle engagement structure according to the present invention.
Figure 5B:
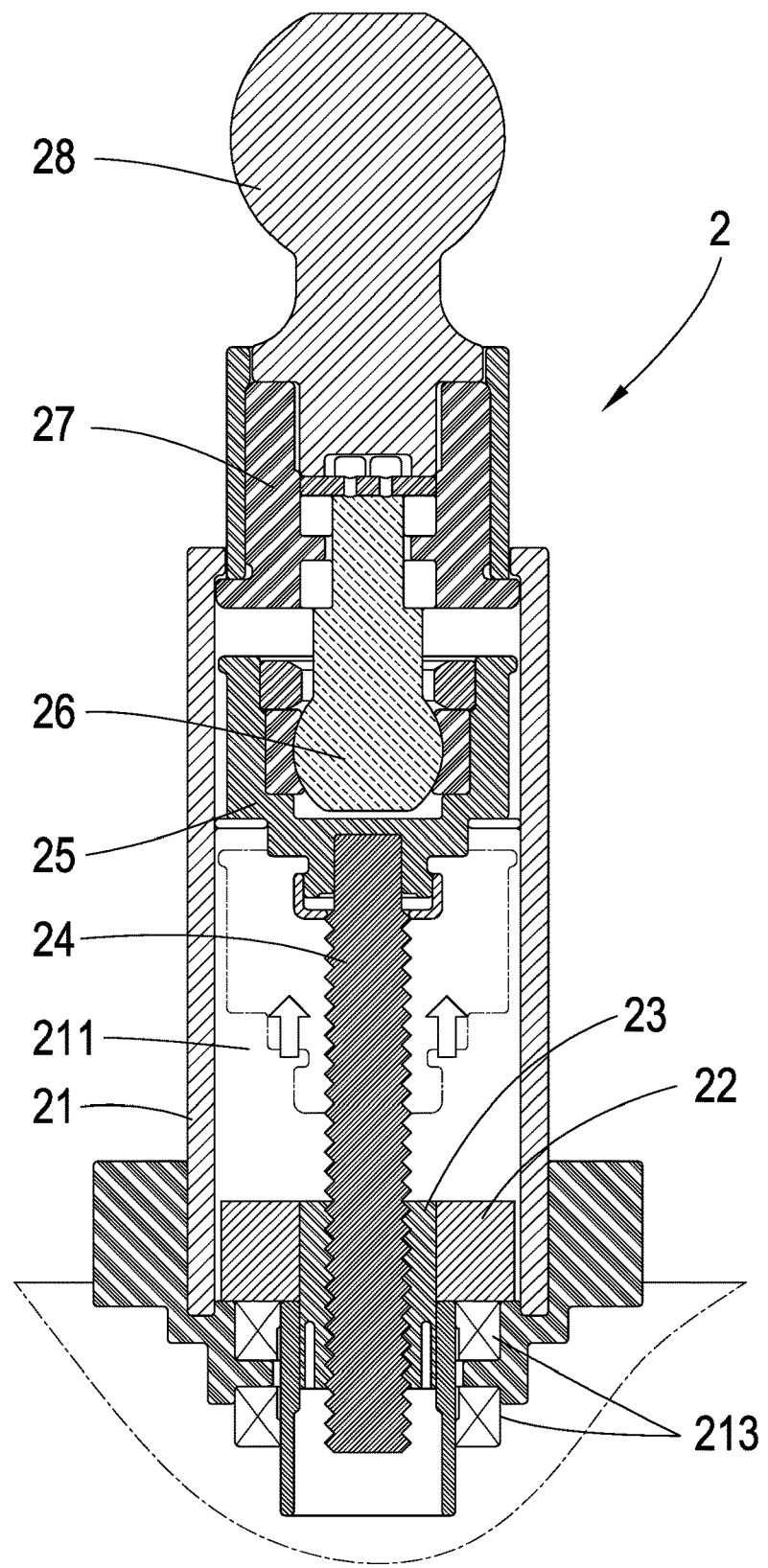
FIG. 5B shows a cross-sectioned view for the implemented ascending of the engagement towage mechanism in the vehicle engagement structure according to the present invention.
Figure 6:
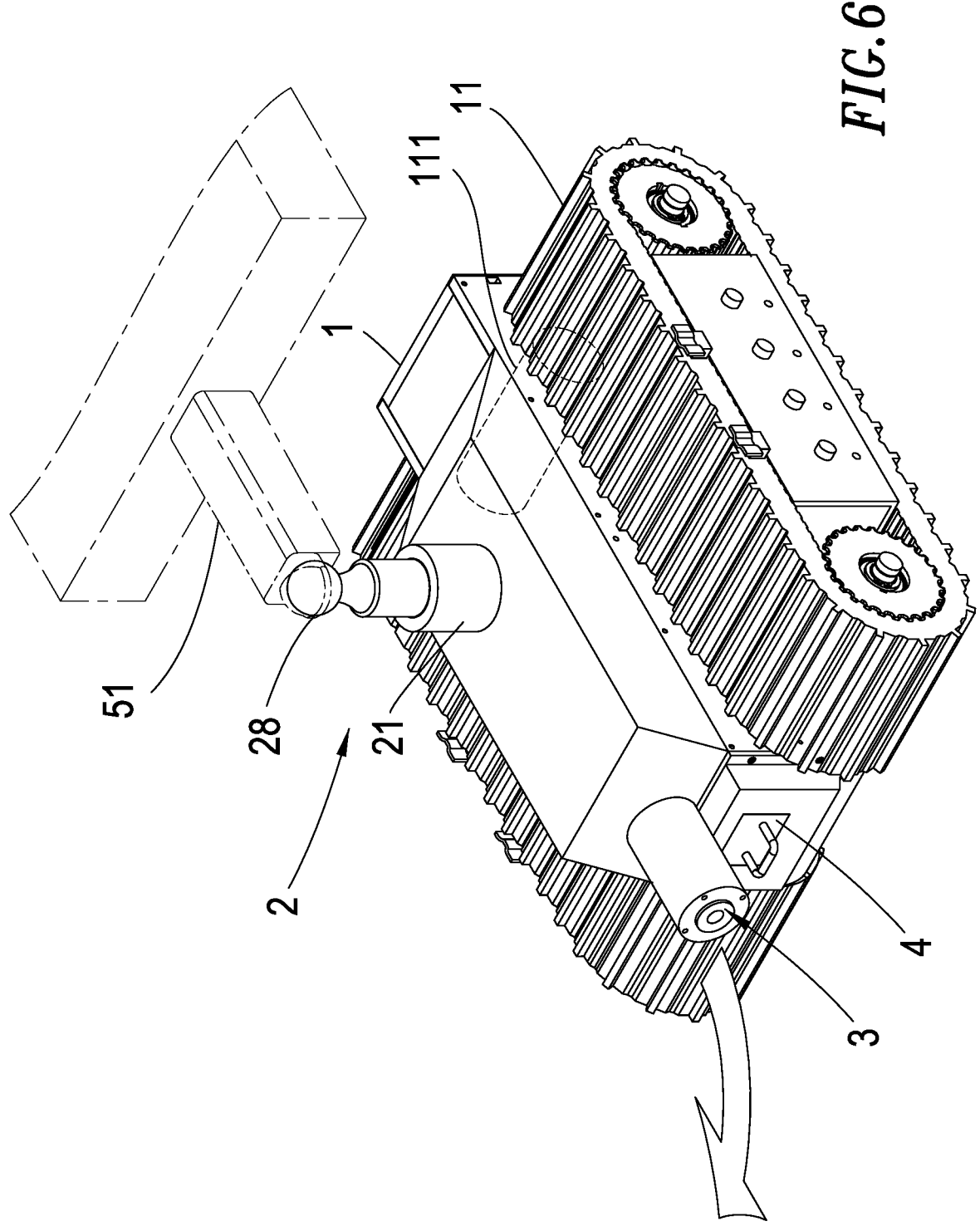
FIG. 6 shows a stereo view for the implemented towage rotation of the engagement towage mechanism in the vehicle engagement structure according to the present invention.

Refer to FIGS. 1 and 4, the vehicle engagement structure for towing transport devices according to the present invention combines the connection end 51 of a transport device 5 with the engagement end 28, and the above-said transport device 5 may be a trailer, a camper van or a large container truck, or even a boat or an aircraft, so that it is possible to remotely control the first motor 111 to operate by means of a control device 6 in order to drive the track 11 to function thereby further dragging the transport device 5 to a designated position, in which the control device 6 may be a mobile device such as a mobile phone, a tablet computer etc. or a remote controller.

Moreover, referring to FIG. 1, in the vehicle engagement structure for towing transport devices according to the present invention, the first motor 111 and the second motor 31 are of the same type so as to facilitate the control device 6 to configure the control setup parameters thereof.

Furthermore, referring to FIGS. 3, 5A, 5B and 6, in the vehicle engagement structure for towing transport devices according to the present invention, the control device 6 can also remotely control the operation of the second motor 31 to drive the transmission rod 33, thus further allowing the transmission rod 33 to drive the external spiral transmission component 22 to rotate via its spiral threads; meanwhile, the external spiral transmission component 22 can also drive the internal spiral transmission component 23 to rotate in the same direction. Subsequently, the internal spiral transmission component 23 drives the spiral rod 24 to rotate, and, by means of the bearing 213, it is possible to implement the idle rotations of the external spiral transmission component 22 and the internal spiral transmission component 23 at their original locations, and the spiral rod 24 spirally engaging the internal spiral transmission component 23 can bring the up-and-down pedestal 25 to move up or move down in the up-and-down space 211 (depending on the clockwise or counter-clockwise rotation, which may be set up via the control device 6), and such move-up or move-down actions are based on the actual demands which are typically determined to match the height of the transport device 5 or otherwise the geological fluctuations or variations of the local terrain for appropriate adjustments, thereby allowing the engagement end 28 to be well and closely jointed with the connection end 51 in order to avoid detachment issues due to the height of the connection end 51 being too high, or to prevent the transport device 5 from tilting backwards and overturn accidents due to the height of the connection end 51 being too low. In addition, upon making a turn during the towage process, the carrier 1 will rotate along the towage direction, and the rotating seat 26 will accordingly create a horizontal idle rotation, thereby releasing the torque force occurring at joint of the engagement end 28 and the connecting end 51 and further making the towage operation smoother along the rotation direction.

The previously disclosed embodiments are merely illustrative of some preferred ones of the present invention, which are not intended to limit the scope thereof; those who are skilled in the relevant technical fields can, after understanding the technical features and embodiments of the present invention as explained hereinabove, certainly make equivalent changes, alterations or modifications without departing from the spirit and scope of the present invention, which are nonetheless deemed as falling within the coverage of the present invention; accordingly, the scope of the present invention to be protected by patent laws is subject to the definition of the claims attached to this specification.

What is claimed is:

1. A vehicle engagement structure for towing transport devices, comprising:
    a carrier, a conveyance track for driving the carrier to operate being respectively installed on both sides of the carrier, with each conveyance track being connectively assembled to a first motor;
    an engagement towage mechanism, installed on the carrier, in which the engagement towage mechanism includes an outer case internally having an up-and-down space, a hole is openly set up on the lateral side of the outer case, an external spiral transmission component is installed in the up-and-down space close to the hole and internally assembled with an internal spiral transmission component, such that the external spiral transmission component can drive the internal spiral transmission component to rotate in the same direction; in addition, the internal spiral transmission component is further spirally connected to a spiral rod, and a bearing is sleeve connected between the bottoms of the external spiral transmission component and the internal spiral transmission component and the outer case, an up-and-down pedestal is fixedly set up on the top of the spiral rod, and a rotation seat having a spherical surface is pivotally installed inside the up-and-down pedestal and is able to make horizontal idle rotations inside the up-and-down pedestal; besides, the top of the rotation seat is fixedly installed with an engagement base, and the top of the engagement base is provided with an engagement end which can be applied to engage a transport device;
    a drive mechanism, installed on the carrier, in which the drive mechanism includes a second motor and a transmission wheel set, and the transmission wheel set is connectively assembled respectively with the second motor and a transmission rod, such that the second motor can drive the transmission rod by means of the transmission wheel set; in addition, a spiral drive component is further pivotally connected on the transmission rod and is spirally jointed with the external spiral transmission component at the hole;
    thus, by using a control device to control the first motor to drive the conveyance track to make transmissions, it is possible to further tow the transport device to a designated location, and control device can be also utilized to control the second motor to drive the transmission rod so as to allow the transmission rod to drive the external spiral transmission component to rotate; meanwhile, the external spiral transmission component also further drives the internal spiral transmission component to rotate in the same direction so that the spiral rod spirally engaging the internal spiral transmission component can drive the up-and-down pedestal to vertically ascend or to descend inside the up-and-down space in order to adapt to the height of the transport device or topographic fluctuations and variations during movement.

2. The vehicle engagement structure for towing transport devices according to claim 1, wherein the transmission wheel set includes two transmission gears and a transmission component connected in sleeve onto each of transmission gears, with one of the transmission gears being connectively assembled with the second motor, while the other one being connectively assembled with the transmission rod.

3. The vehicle engagement structure for towing transport devices according to claim 2, wherein the transmission component uses a belt or a chain.

4. The vehicle engagement structure for towing transport devices according to claim 1, wherein the transmission rod is pivotally connected with plural support frames.

5. The vehicle engagement structure for towing transport devices according to claim 4, wherein each of the transmission rods is fixedly installed on the periphery of the outer case.

6. The vehicle engagement structure for towing transport devices according to claim 4, wherein the spiral drive component is located between each of the support frames.

7. The vehicle engagement structure for towing transport devices according to claim 1, wherein both the first motor and the second motor are connected to urban power grid to obtain electricity.

8. The vehicle engagement structure for towing transport devices according to claim 1, wherein both the first motor and the second motor are connected to a battery to obtain electricity.

9. The vehicle engagement structure for towing transport devices according to claim 1, wherein the battery is fully charged and prepared in advance and is replaceable in case necessary, and the carrier is openly configured with a power supply chamber for accommodating the battery in order to facilitate the electricity supply to the first motor and the second motor.

10. The vehicle engagement structure for towing transport devices according to claim 1, wherein the control device is a mobile phone, a tablet computer or a remote controller.

* * * * *